United States Patent [19]
Dzioba

[11] Patent Number: 4,586,468
[45] Date of Patent: May 6, 1986

[54] TANDEM PUMP ASSEMBLY

[75] Inventor: Donald L. Dzioba, Frankenmuth, Mich.

[73] Assignee: General Motors Corporation, Detroit, Mich.

[21] Appl. No.: 658,278

[22] Filed: Oct. 5, 1984

[51] Int. Cl.$^4$ .................. F02B 77/14; F04B 17/00; F04B 23/12; E04C 11/00
[52] U.S. Cl. .................. 123/198 C; 417/364; 417/429; 418/3
[58] Field of Search ............ 418/3, 171; 417/364, 417/429; 123/195 C, 198 C

[56] References Cited

U.S. PATENT DOCUMENTS

| | | | |
|---|---|---|---|
| 1,341,915 | 6/1920 | Ladd et al. | 417/364 |
| 1,665,670 | 4/1928 | Manzed | 418/3 |
| 1,695,152 | 12/1928 | Martindale | 418/3 X |
| 2,698,576 | 1/1955 | Strub | 417/429 X |
| 2,837,075 | 6/1958 | Leach | 123/195 C |
| 4,134,713 | 1/1979 | Binaut | 418/191 X |
| 4,436,067 | 3/1984 | Fritzenwenger | 123/198 C |

FOREIGN PATENT DOCUMENTS

| | | | |
|---|---|---|---|
| 152714 | 1/1951 | Australia | 418/3 |
| 454455 | 10/1936 | United Kingdom | 123/198 C |
| 1234889 | 6/1971 | United Kingdom | 418/3 |
| 2026612 | 2/1980 | United Kingdom | 417/364 |

Primary Examiner—Carlton R. Croyle
Assistant Examiner—Theodore W. Olds
Attorney, Agent, or Firm—R. L. Phillips

[57] ABSTRACT

A tandem pump arrangement is disclosed comprising a first pump having two meshing gears of different pitch diameter adapted to produce pumping action by their meshing engagement upon drive to the one gear having the larger pitch diameter and the drive thereby of the other gear having the smaller pitch diameter at a higher speed. A second pump has an input connected to be driven by the gear with the smaller pitch diameter with the result that the second pump is driven through the first pump at increased speed with an overdrive ratio determined by the ratio of the pitch diameters of the gears.

1 Claim, 4 Drawing Figures

TANDEM PUMP ASSEMBLY

TECHNICAL FIELD

This invention relates to a tandem pump assembly and more particularly to providing an overdrive therein to one of the pumps to reduce the size thereof.

BACKGROUND OF THE INVENTION

The broad idea of combining one pump with another in tandem is not new. It is known, for example, to combine a vacuum pump with the power steering pump in a motor vehicle where an internal combustion engine used to power the vehicle lacks sufficient manifold vacuum to operate one or more vacuum motors used in the control system(s) of the vehicle. However, such an additional pump normally requires additional underhood space adjacent the engine which may not be normally available.

SUMMARY OF THE INVENTION

The present invention is directed to providing a tandem pump assembly wherein the size of the added pump is minimized by the inclusion of a simply incorporated overdrive in the first pump. This is accomplished by having a first pump comprise two meshing gears of different pitch diameter with input then being to the gear having the larger pitch diameter and with the drive thereby of the other gear having the smaller pitch diameter than being at a higher speed than the input. The second pump is then tandemingly arranged and connected to have its input driven directly by the gear having the smaller pitch diameter whereby the second pump is thus driven through the gear type pump at increased speed with an overdrive ratio determined by the ratio of the pitch diameters of the gears (i.e. the gear ratio). As a result, the second pump can then be sized smaller than if it were driven at the same speed as the first pump.

In the preferred embodiment, the improved pump assembly of the present invention is adapted for use in a motor vehicle with the entire assembly located in the oil pan of the engine powering the vehicle. The gear pump in this case is adapted to serve as the engine's oil pump while the additional pump is adapted to serve as a vacuum pump to meet the vehicle's vacuum requirements. The gear type oil pump is then conveniently driven in the normal manner by the engine's camshaft which in turn is driven by the engine's crankshaft at half crankshaft speed. However, with the overdrive provided by the gear type oil pump to the vacuum pump, the vacuum pump is driven at increased speed relative to the oil pump. This permits the latter pump to be downsized through selection of the gear ratio of the oil pump gears to thereby minimize the space required for the tandem assembly of the vacuum pump with the engine's oil pump in the oil pan of the engine. Moreover, this arrangement provides design flexibility in that the vacuum pump can readily be added as desired and without requiring special or additional underhood space which may not be normally available.

In addition to the second pump being made smaller, it will also be shown that it can be made lighter and with less parts as well as be easier to manufacture and assemble with the elimination of some tolerance stack-ups all resulting in reduced costs.

These and other objects, features and advantages of the present invention will become more apparent from the following description and drawing in which:

DESCRIPTION OF THE PREFERRED EMBODIMENT

Figure 1:
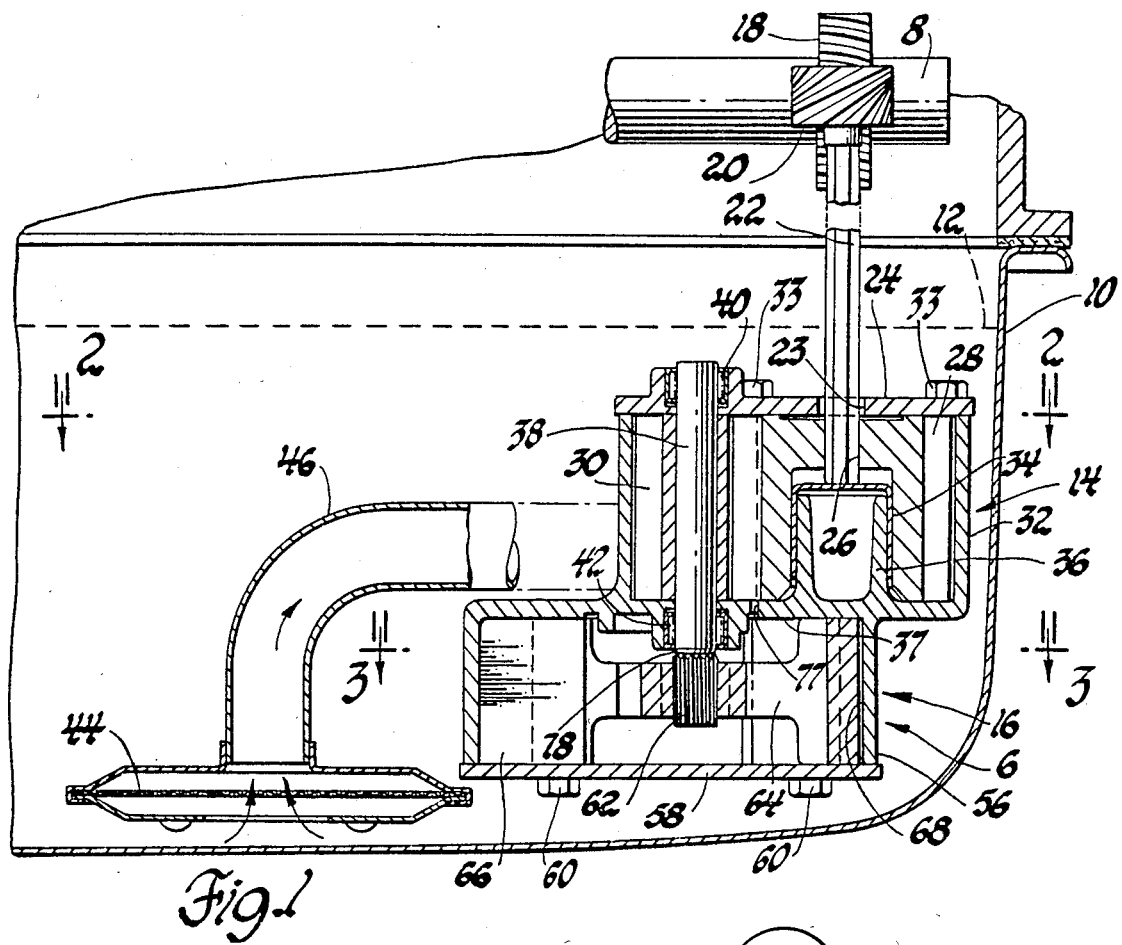
FIG. 1 is an elevational view partially in section of the preferred embodiment of the tandem pump assembly according to the present invention adapted for use in the engine of a motor vehicle to serve as an oil pump and vacuum pump.

Referring to FIG. 1, there is shown the preferred embodiment of the tandem pump assembly according to the present invention generally designated as 6 and adapted for use in a motor vehicle's engine of which only those parts believed helpful to understanding the present invention are shown. As to the engine, there is the normal camshaft 8 which is driven from the engine's crankshaft (not shown) at half crankshaft speed in a manner well-known and common to reciprocating engines. In addition, the engine typically has beneath the camshaft 8 an oil pan or sump 10 in which oil for engine lubrication is normally maintained at the level indicated as 12.

The tandem pump assembly 6 is mounted in the oil pan 10 beneath the oil level 12 and comprises a gear type pump section 14 and a tandemly arranged vane type pump section 16 with the former adapted to supply the oil under pressure to lubricate the engine and the latter adapted to meet the various vacuum requirements of the vehicle such as vacuum assisted power brakes, EGR, cruise control and heating/air conditioning controls (not shown).

Figure 2:
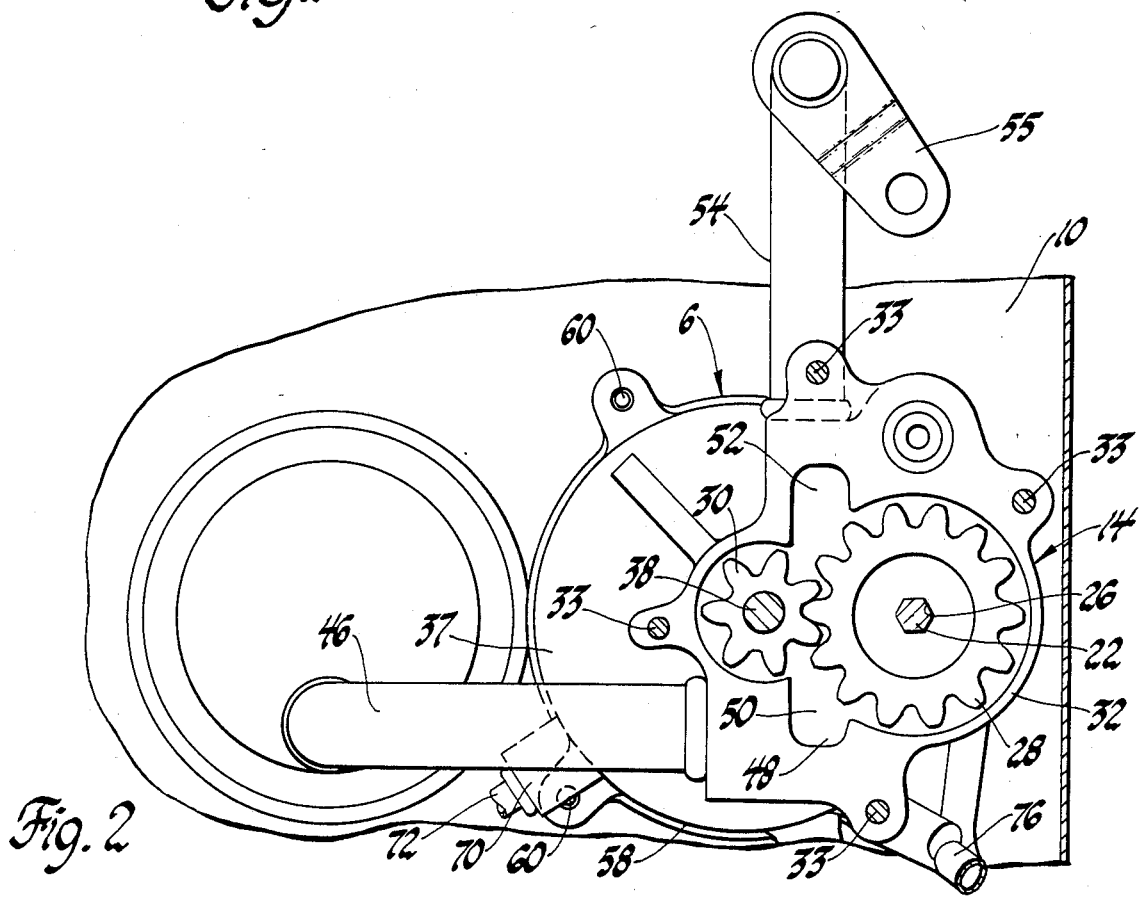
FIG. 2 is a view taken along the line 2—2 in FIG. 1.

Drive to the tandem pump assembly is provided by a helical drive gear 18 which is fixed to the camshaft 8 and meshes with a helical driven gear 20. The latter gear is rotatably mounted and axially retained in a conventional manner in the engine and is connected to the upper end of a pump input shaft 22 of hexogonal cross-section extending at right angles to the camshaft. The pump input shaft 22 extends with clearance through a hole 23 in a top cover plate 24 of gear pump section and engages in a hexogonal hole 26 in a pump gear 28. The pump gear 28 meshes with a second pump gear 30 with both these gears being rotatably mounted in a housing 32 closed by the cover plate 24 which is secured with bolts 33 (see FIGS. 1 and 2). The pump gear 28 is rotatably supported by a bearing cap 34 that is fitted on an upstanding stationary stub shaft 36 integral with the bottom side 37 of the housing and acts as a stop for the lower end of the pump input shaft 22. The other pump gear 30 which is thus driven by the input driven pump gear 28 is on the other hand rotatably supported in the housing 32 by being affixed to a shaft 38 that is rotatably supported at its upper end in the top cover plate 24 by a needle bearing 40 and is rotatably supported adjacent its lower end by a needle bearing 42 in the bottom side 37 of the housing 32. The oil is pulled in from the bottom of the sump 10 through a filter 44 and an intake tube 46 into the suction side 48 of the gear pump cavity 50 by the displacement of the meshing gears 28 and 30 with the former gear driving the latter and thus the shaft 38.

The oil thus taken into the gear spaces is displaced into the pressure side 52 of the gear pump cavity from which it is delivered to the engine's lubrication system via an outlet pipe 54 with a bracket 55 fixed to the exit end of this tube serving to secure the tandem pump assembly 6 to the engine and in place in the oil pan.

Figure 3:
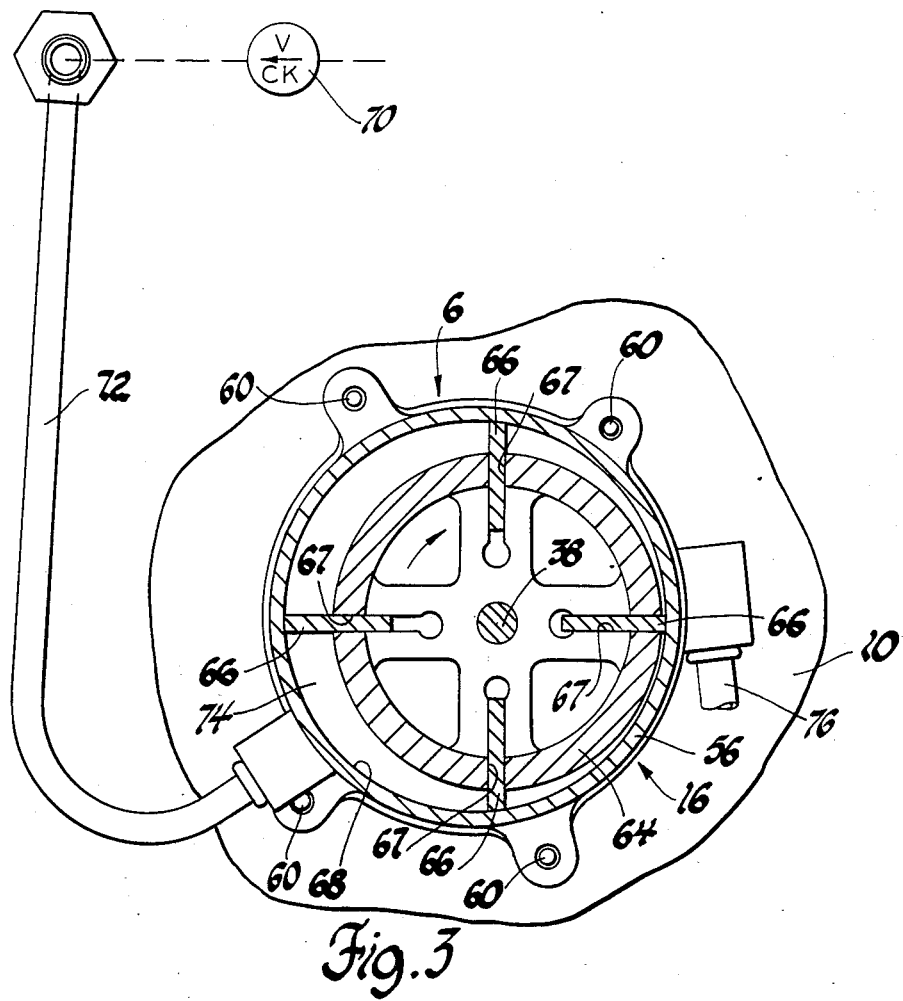
FIG. 3 is a view taken along the line 3—3 in FIG. 1.

The thus driven shaft 38 in the gear pump section 14 is used as the input or drive to the vane pump section 16 and to that end extends through and past (beneath) the bottom side 37 of the housing 32 into the vane pump section whose upper side is formed by the bottom side of the gear pump housing and whose peripheral housing 56 is clamped thereagainst by a bottom cover plate 58 secured with bolts 60 (see FIGS. 1 and 3). In the vane pump section, the shaft 38 is drivingly connected at its lower end by serations 62 to a rotor 64 on which a plurality of vanes 66 are slidably supported in slots 67 for radial movement. The vanes 66 engage a cylindrical surface 68 in the housing 56 eccentric to the rotor axis (i.e. that of shaft 38) whereby the vanes are caused to reciprocate on the rotor during rotation thereof to effect pumping action in a well-known and conventional manner. In the vane pump, air is drawn in through a vacuum intake check valve 70 and an intake tube 72 into the intake quadrant of the vane pump cavity 74. The air is taken into the expanding volumes between the vanes in the intake quadrant and discharged from the diminishing volumes between the vanes in the discharge quadrant through a vacuum exhaust tube 76 into the engine sump above the oil level 12. The vane pump is lubricated by the oil in the sump and because of the exhaust exit to the sump, this oil is returned thereto and not lost.

In the drive thus effected through the meshing oil pump gears to the vacuum pump, an overdrive is simply provided by the engine driven oil pump gear 28 being formed with a larger pitch diameter than that of the other oil pump gear 30 that it drives. For example, in the construction shown the pitch diameter of the oil pump drive gear 28 is made twice that of the oil pump driven gear 30 thus producing a 1:2 pitch diameter ratio or gear ratio. As a result, the vane pump rotor 64 is driven at twice the input speed to the oil pump thereby allowing the vane pump to be made half the displacement size that would be required if it were driven at the same speed as the oil pump.

Figure 4:
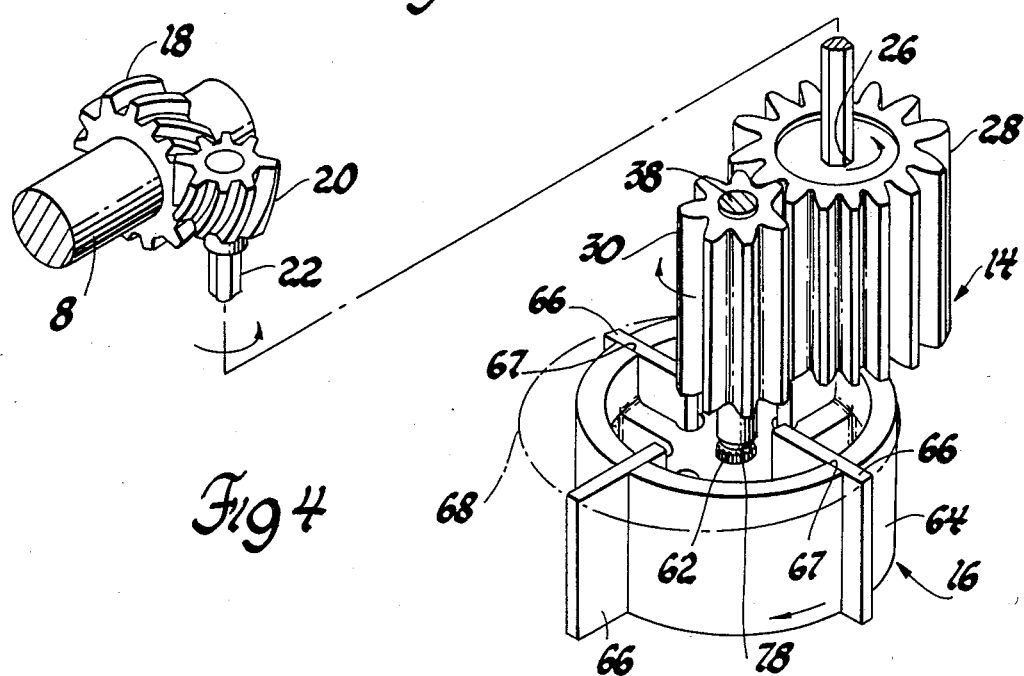
FIG. 4 is an isometric view of the basic operating parts of the tandem pump assembly in FIG. 1.

In addition to the overdrive feature in the gear pump which permits minimizing the size of the vane pump through selection of the overdrive ratio, other features in the arrangement include the provision of a V-notch 78 formed in the vacuum pump drive shaft 38 between the overdriven oil pump gear 30 and the vane pump rotor 64 (see FIGS. 1 and 4). This notch is sized so that should the vacuum pump seize or stop rotating for any reason, the shaft 38 will then shear at this notch so as to permit the engine oil pump to continue to function undisturbed.

Furthermore, it will be seen that in combining the vane pump with the gear pump, the housing 32 of the latter is common to both units in that in addition to serving as the main housing for the pump gears, it also serves at its bottom side 37 as a side housing for the vane pump thereby saving both space and materials. Moreover, it will be seen that the tandem pump assembly is of modular type permitting the vacuum pump to be selectively added at engine dress thereby further reducing costs. In addition, there is one simple built-in drive mechanism for the vacuum pump rather than having to supply belts, pulleys, etc. to drive the vacuum pump separately. Furthermore, there is eliminated the need for separate vacuum pump bracketing since it is integrally mounted with the oil pump. Moreover, additional underhood space saving is provided in that the belt train space available for other accessories is freed of any requirement for the addition of the vacuum pump.

It will also be appreciated that while the preferred embodiment of the tandem pump assembly is shown adapted to operate as an oil pump and a vacuum pump in a motor vehicle installation, the dual pump arrangement of the present invention with the overdrive by the gear pump to the second pump may have other applications and that the latter pump need not be a vane pump and could for example be another hydraulic pump or compressor of the gear type or some other type such as a centrifugal pump where increased input speed thereto relative to that of the first pump is of benefit. And thus the above described preferred embodiment is intended to be illustrative of the invention which may be modified within the scope of the appended claims.

The embodiments of the invention in which an exclusive property or privilege is claimed are defined as follows:

1. In combination, an engine having an oil pan containing oil at a certain level, a tandem pump arrangement mounted in said oil pan, said pump arrangement comprising an oil pump for delivering the oil under pressure to lubricate the engine and a vacuum pump for establishing a vacuum, said oil pump having two meshing gears of different pitch diameter adapted to produce oil pumping action by their meshing engagement upon drive to the one gear having the larger pitch diameter and the drive thereby of the other gear having the smaller pitch diameter at a higher speed, drive means for connecting the engine to drive said one gear, said vacuum pump having an input connected to be driven by said other gear whereby said vacuum pump is driven through said oil pump at increased speed with an overdrive ratio determined by the ratio of the pitch diameters of said gears, said vacuum pump being lubricated by the oil in the oil pan and having an exhaust line exiting in the oil pan above said oil level so as to ensure return of such oil to the oil pan.

* * * * *